United States Patent Office 3,666,437
Patented May 30, 1972

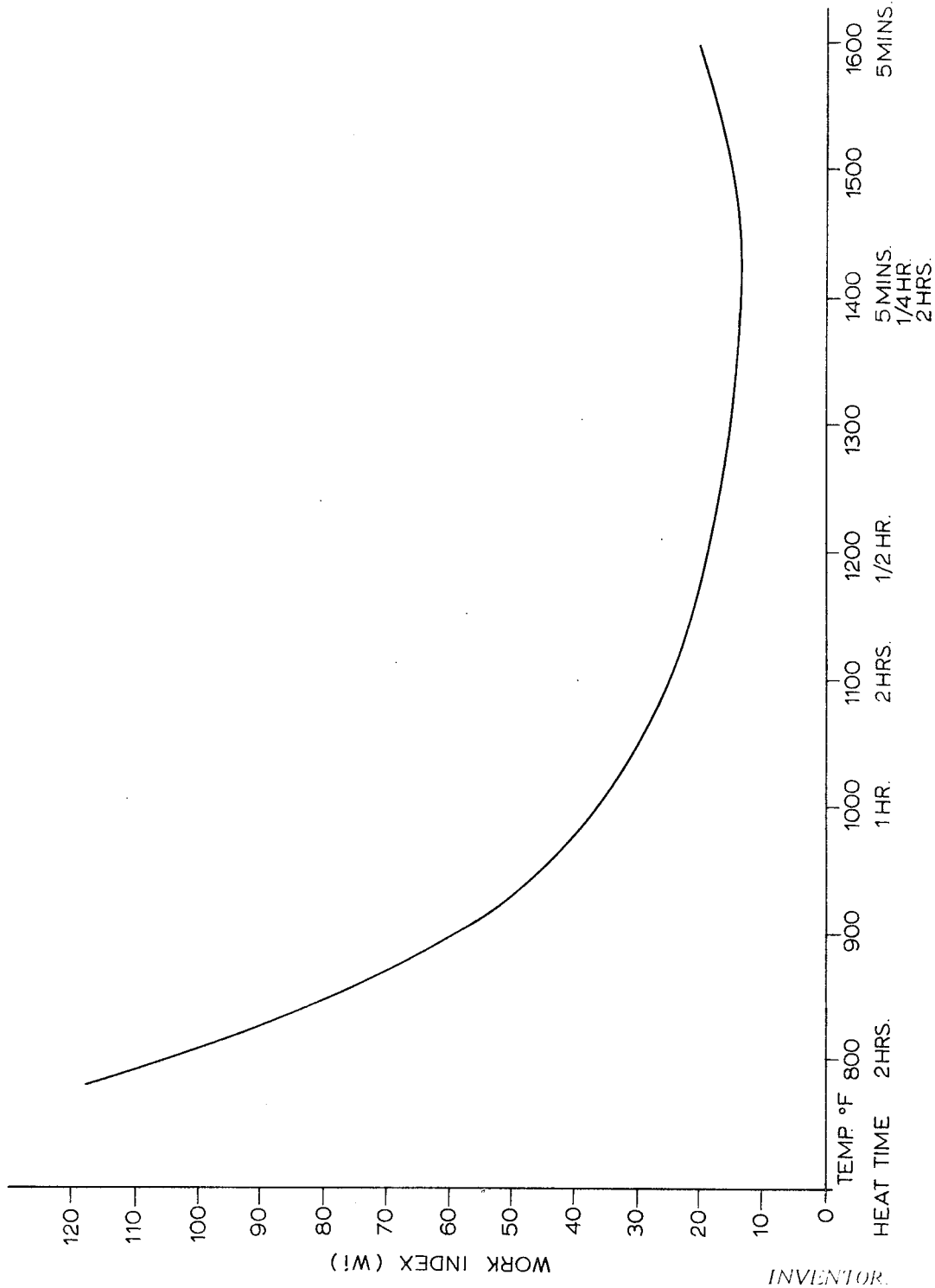

3,666,437
TREATMENT OF IRON-NICKEL-CHROMIUM ALLOY SCRAP TO FACILITATE RECOVERY OF METAL VALUES BY LEACHING
Ernest Mehl, Fort Saskatchewan, Alberta, Michael Kohut, Edmonton, Alberta, and Paul Kawulka, Fort Saskatchewan, Alberta, Canada, assignors to Sherritt Gordon Mines Limited, Toronto, Ontario, Canada
Filed Nov. 24, 1969, Ser. No. 879,302
Int. Cl. B22f 9/00; C22b 23/04
U.S. Cl. 75—.5 BA
8 Claims

ABSTRACT OF THE DISCLOSURE

Nickel, iron and chromium containing alloy scrap is treated to facilitate recovery of nickel and other contained non-ferrous metal values, such as cobalt and copper, by grinding and leaching. The alloy scrap is converted to a low-sulphur matte and then shotted. The shot is then heated in a neutral, oxidizing or reducing atmosphere at temperature in the range of 800° F. to 1700° F. for a period of time sufficient to substantially improve the grindability thereof. Preferably the heating is conducted at 1400° F. for 30 minutes.

---

This invention relates to the treatment of nickel, iron and chromium containing alloy scrap to facilitate recovery of metal values by leaching. More particularly, the invention relates to the heat treatment of alloy scrap which has been converted to a low sulphur matte and then shotted. The heat treatment improves the grindability of the scrap and, also, increases its responsiveness to leaching for extraction of nickel and other non-ferrous metals such as cobalt and copper which are commonly present in nickel containing alloy scrap materials.

BACKGROUND OF THE INVENTION

A number of hydrometallurgical processes are used with varying degrees of success for the recovery of non-ferrous metals from iron alloys, such as ferro-nickel, for example. Such processes generally involve grinding the alloy to fine particle sizes and then leaching the particles with suitable reagents, such as aqueous ammoniacal ammonium sulphate or sulphuric acid in the presence of oxygen.

These processes are generally commercially unattractive when applied to nickel-iron-chromium alloy scrap because of the extreme difficulty in grinding such scrap alloys to a size which is amenable to leaching. Also, this problem is greatly aggravated where the alloy scrap contains other alloying metals such as copper, cobalt, manganese, molybdenum and tungsten, for example. Further, even when fine particle size is achieved by extensive grinding, the material remains very resistant to leaching and severe leaching conditions and prolonged leaching times are required to extract nickel and other desired non-ferrous values such as cobalt and copper.

It is accordingly an object of the present invention to provide a process for treating nickel-iron-chromium alloy scrap to improve the responsiveness of such materials to grinding and leaching for recovery of nickel and other desired non-ferrous metal values such as cobalt and copper which may be contained therein.

Another object of the invention is to provide an efficient and economic method for converting nickel-iron-chrmium alloy scrap materials to a form which may be readily ground and leached in aqueous ammonium sulphate or sulphuric acid solution for the recovery of nickel and other desired metal values.

Other objects and advantages of the invention will become apparent from the following detailed description.

SUMMARY OF THE INVENTION

The process by which the objects of the invention are achieved is based on the discovery that a low-sulphur matte prepared from nickel-iron-chromium alloy scrap can be easily ground to particles of a size which may be efficiently leached in sulphuric acid or ammoniacal ammonium sulphate solution to yield nickel and other values, such as copper and cobalt when present in the scrap, if the matte is shotted and subjected to heat treatment before the grinding step. The heat treatment step, in addition to improving the grindability of the matte, improves the extraction of nickel values from the ground matte. Improvement in the extraction of any cobalt and copper values in the matte will also be obtained according to the process.

According to the invention, nickel-iron-chromium alloy scrap is first melted and converted to a low sulphur matte by addition of up to about 12% by weight sulphur. The sulphur containing melt is shotted or atomized to produce solid granules of matte, and the granules are then heated within the temperature range of 800° F. to about 1700° F. for a period of time up to about 2 hours to increase the grindability of said granules.

Although the shotted matte itself is much more readily ground than the straight scrap, quite surprisingly the heat treatment of the shotted matte results in a remarkable additional improvement in grindability. It is believed that the result of subjecting the matte to the heating operation following the atomizing or shotting step is a weakening of the bonds between atoms in the crystal structure developed in the matte during atomizing and cooling.

It is to be understood that the term "nickel-iron-chromium alloy scrap" as used herein is intended to include all alloys containing nickel, iron and chromium as well as alloys containing, in addition to nickel, iron and chromium, other alloying elements such as copper, cobalt, molybdenum, manganese and tungsten which are commonly contained in nickel alloys. In addition to these metals, the scrap material may also contain a wide variety of other elements which are usually present in alloy scrap materials either as a constituent of the alloys or as contaminants introduced in the scrap collecting and sorting operations.

DESCRIPTION OF THE PREFERRED EMBODIMENTS

In carrying out the invention, the scrap is first melted and mixed with a small quantity of sulphur. The sulphur may be added in elemental form or in the form of a sulphur containing mineral. Preferably, it is added in the form of a pyrite. The specific amount of sulphur added depends on the composition of the scrap material. For example, scrap having a high Mn content, e.g. more than about 1 wt. percent Mn, requires more sulphur than low Mn material. For economic reasons, it is desirable to use the minimum amount of sulphur that is effective to improve the grindability of the particular scrap material being treated. In general, up to about 12% sulphur by weight may be added but in most cases 3% to 7% is sufficient.

The molten, sulphur containing material is then atomized or shotted by any conventional method to form granules of matte. (For the sake of convenience, this material is referred to herein as "matte" although it will be understood that its sulphur content in all cases will be much lower than that of conventional non-ferrous metal mattes.) The preferred atomizing or shotting method involves directing jets of water at a stream of the molten alloy to break up and solidify the material into fine granules.

Following the shotting operation, the matte is subjected to heat treatment. Preferably this is carried out on a continuous basis in a direct fired rotary kiln although muffle, crucible or retort type furnaces may also be used. The heating atmosphere may be oxidizing, such as an air atmosphere, neutral such as a nitrogen atmosphere or reducing, such as a hydrogen atmosphere. For a practical commercial operation preferably the heating atmosphere consists of the products of combustion of the heating fuel. A reducing atmosphere improves the leachability of some materials, particularly where an ammonium sulphate leach is employed.

The temperature at which the matte is heated is important. The range of permissible temperatures will vary according to the precise nature of the matte subjected to the treatment but in most cases is within the broad range and lower limits are not critical to the general operability of the present invention, there is relatively little improvement in the grindability of the matte when the heat treatment is carried out at temperature outside the broad range. At temperatures of less than 1200° F. only a moderate improvement in grindability results from heat treatment for a shorter time than one hour and at temperatures of about 1600° F., treatment for longer than about required to produce significant improvement. At temperatures of about 1600° F., treatment for longer than about 15–20 minutes is not desirable because grindability deteriorates as the period of heat treatment lengthens. The preferred temperature is 1400° F. At this temperature, a treatment as short as five minutes will result in significant improvement in the grindability of the matte. However, the preferred period of heat treatment at 1400° F. for a practical commercial operation is about 30 minutes.

The treated matte discharged from the heating step can be readily ground and leached by conventional procedures to extract nickel and other desired non-ferrous metal values.

In most cases, the ground matte responds best to aqueous acid oxidation leaching at elevated temperature and pressure. According to this procedure, the ground matte is dispersed in an aqueous sulphuric acid solution containing at least the stoichiometric amount of acid required to combine with the contained nickel, cobalt and copper as sulphates. The resulting slurry is heated to about 250° F.–260° F. with continuous agitation and under a partial pressure of oxygen of about 15–30 p.s.i. About 4–6 hours is usually required to obtain extraction of 90% or more of the nickel and cobalt. Iron remains in the leach residue in oxidized compound form together with other of the alloy scrap constituents such as chromium and tungsten etc.

Alternatively, the heat treated, ground matte can be leached by means of ammoniacal ammonium sulphate solution. A satisfactory leach system contains about 150 grams per litre free ammonia (introduced into solution as, for example, ammonium hydroxide), about 300 grams per litre ammonium sulphate and sufficient ground matte to provide 60 grams per litre nickel plus cobalt plus copper in solution. The system is heated with agitation to approximately 185–200° F. under an oxygen pressure of 20 p.s.i.g. to dissolve the nickel and other soluble metal values.

The invention is further described in the following examples which are intended as illustrative only and not by way of limitation.

EXAMPLE 1

This example illustrates the effect of preheating on the grindability of the matte. The material used for the test was a high temperature resistant nickel alloy scrap. A small amount of sulphur was mixed with the scrap while molten and the material was shotted by pouring the molten alloy past jets of water. The resulting matte analyzed Ni—32.1%; Co—3%; Cu—11.2%; Fe—32.0%; S—5.2%; Cr—3.5%; Mo—0.9% and M—0.4%.

Approximately 60 lbs. of minus 10 mesh matte were riffled into 2000 gram samples. Each sample was subjected to heat treatment in a furnace under varying conditions. Grindability of the sample, expressed as a work index, was determined as follows:

Each sample of matte and 800 mls. of water were charged into a 10½" x 11½" long steel ball mill. The mill contained the following weights of balls:

|  | Grams |
|---|---|
| ½" balls | 3,928 |
| 1" balls | 1,477 |
| 1¼" balls | 8,417 |

The mill was rotated at 42 r.p.m. for four hours. The slurry from the ball mills was first wet screened through a minus 325 mesh screen then the plus 325 mesh fraction dry screened to obtain the screen analysis.

A two thousand gram sample of broken glass was milled in the same manner.

The work index was calculated by the following formula:

$$Wi_1 \left( \frac{10}{\sqrt{p}} - \frac{10}{\sqrt{f}} \right) = Wi_2 \left( \frac{10}{\sqrt{p_2}} - \frac{10}{\sqrt{f_2}} \right)$$

where Wi=work index (1: shot, 2: glass) $p$=80% passing size of product in microns, $f$=80% passing size of feed in microns.

The results of the test are shown graphically in FIG. 1. The tests show that maximum improvement in grindability can be obtained by heat treatment at 1400° F. for 5 to 120 minutes but at temperatures of 1100° F. to 1200° F. at least 120 minutes is required for significant improvement.

| Sample | Vol./wt. mls./gm. | Percent or g.p.l. | | | | | | | | Remarks |
|---|---|---|---|---|---|---|---|---|---|---|
| | | Ni | Co | Cu | Fe | S | Cr | Mo | NH₃ | |
| Filtrate | 2,050 | 19.9 | 1.37 | 20.8 | | 77.5 | 2.21 | 0.30 | 119 | —100 mesh, not heat treated. |
| Wash water | 3,375 | 1.23 | 0.09 | 1.34 | | | | | | |
| Residue | 136 | 8.78 | 0.76 | 2.85 | 47.6 | 0.50 | | | | |
| Percent extraction | | 78.4 | 72.2 | 92.7 | | 97.3 | 37.0 | 54.0 | | |
| Filtrate | 2,425 | 20.2 | 1.42 | 18.4 | | 79.4 | 0.24 | 0.30 | 100 | —100 mesh, heat treated at 1400° F. in H₂. |
| Wash water | 1,840 | 2.8 | 0.21 | 2.63 | | | | | | |
| Residue | 169 | 2.16 | 0.21 | 0.87 | 41.4 | 4.76 | | | | |
| Percent extraction | | 96.3 | 91.1 | 97.3 | | 70.8 | 0.7 | 54.0 | | |
| Filtrate | 2,080 | 23.8 | 1.69 | 21.7 | | 76.5 | 0.26 | 0.37 | 129 | —100 mesh, heat treated at 1400° F. in N₂. |
| Wash water | 2,490 | 1.94 | 0.14 | 1.84 | | | | | | |
| Residue | 145 | 1.77 | 0.18 | 0.72 | 45.6 | 3.22 | | | | |
| Percent extraction | | 95.2 | 93.0 | 97.9 | | 82.0 | 0.4 | 66.0 | | |
| Filtrate | 1,600 | 28.4 | 2.06 | 10.4 | | 83.6 | 0.69 | 0.44 | 125 | —100 mesh, heat treated at 1400° F. in air. |
| Wash water | 3,550 | 1.64 | 0.13 | 1.31 | | | | | | |
| Residue | 146 | 4.83 | 0.49 | 1.80 | 47.7 | 1.03 | | | | |
| Percent extraction | | 88.1 | 80.4 | 94.3 | | 93.5 | 0.99 | 61.3 | | |

What we claim as new and desire to protect by Letters Patent of the United States is:

1. The process for treating nickel, iron and chromium containing alloy scrap to enable recovery of nickel values therefrom by grinding and leaching which comprises the steps of heating said alloy scrap to above its melting point, adding up to about 12% by weight sulphur thereto, atomizing the sulphur containing melt to produce solid granules of matte, and heating said granules within the temperature range of 800° F. to about 1700° F. for a time sufficient to increase the grindability of said granules.

2. The method as claimed in claim 1 wherein said granules are heated to a temperature within the range of about 1100° F. to about 1400° F.

3. The method as claimed in claim 2 wherein said granules are heated to about 1400° F. for about ½ hour.

4. The method as claimed in claim 1 wherein about 3% to about 7% sulphur is added to said nickel alloy scrap metal.

5. The method according to claim 4 wherein the sulphur is added in the form of pyrite.

6. The method as claimed in claim 1 wherein said granules are heated in a reducing atmosphere.

7. The method according to claim 1 wherein the granules are heated in air.

8. The method according to claim 1 wherein the granules are heated in a neutral atmosphere.

References Cited
UNITED STATES PATENTS

| | | | |
|---|---|---|---|
| 1,739,052 | 12/1929 | White | 75—0.5 BA |
| 1,739,068 | 12/1929 | Harris | 75—0.5 BA |
| 2,488,926 | 11/1949 | Mousson | 75—0.5 BA |
| 3,141,760 | 7/1964 | Finke et al. | 75—0.5 BA |
| 3,468,629 | 9/1969 | Curlook et al. | 75—0.5 BA |

L. DEWAYNE RUTLEDGE, Primary Examiner

W. W. STALLARD, Assistant Examiner

U.S. Cl. X.R.

75—82; 148—126; 264—12, 13